April 9, 1968                H. SCHOTT                3,377,546
CIRCUIT ARRANGEMENT FOR CONTROLLING A SWITCHING
TRANSISTOR IN A D.C. CONTROL CIRCUIT
Filed Sept. 16, 1964                                2 Sheets-Sheet 1
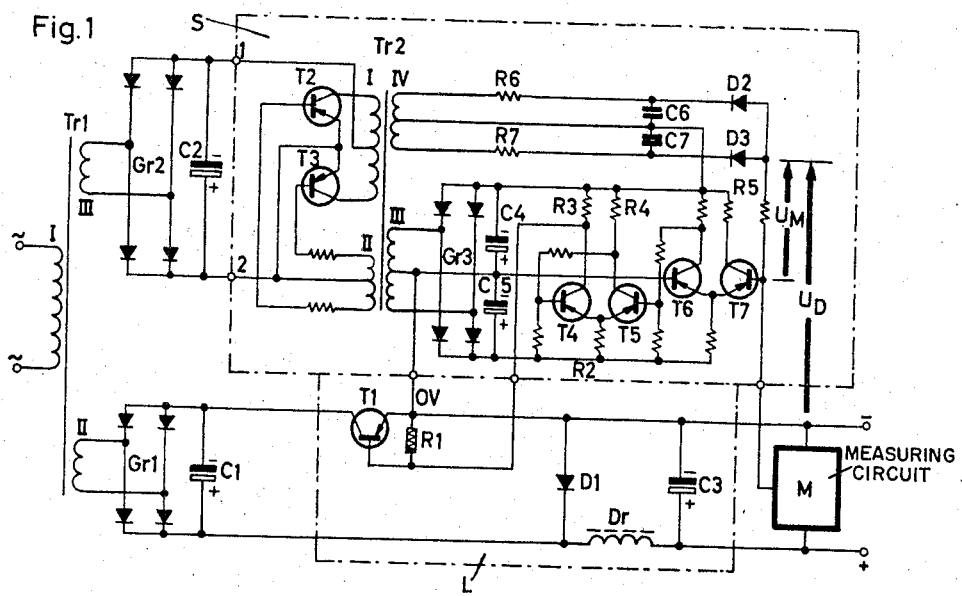
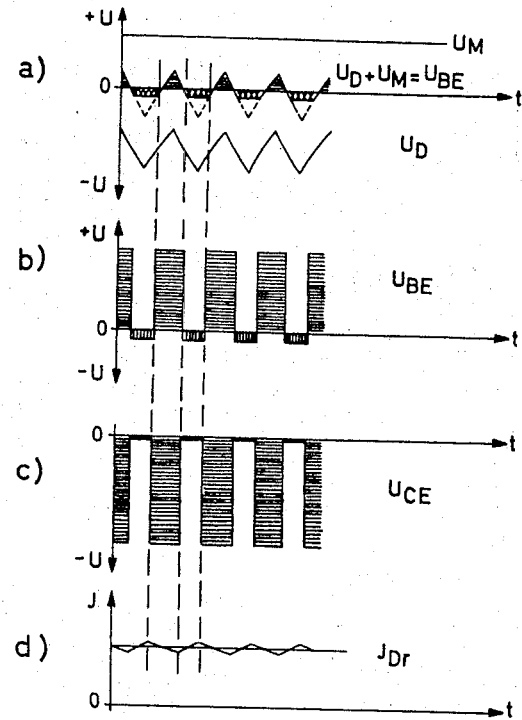

United States Patent Office 3,377,546
Patented Apr. 9, 1968

3,377,546
CIRCUIT ARRANGEMENT FOR CONTROLLING A SWITCHING TRANSISTOR IN A D.C. CONTROL CIRCUIT
Heinrich Schott, Munich-Solln, Germany, assignor to Siemens Aktiengesellschaft, a corporation of Germany
Filed Sept. 16, 1964, Ser. No. 396,982
Claims priority, application Germany, Sept. 19, 1963, S 87,400
2 Claims. (Cl. 323—22)

ABSTRACT OF THE DISCLOSURE

A method of stabilizing a direct voltage with an adjusting transistor lying in the series branch of the stabilization circuit, a choke serving as energy storage, and a diode arranged in a transverse branch, operative to effect a periodic switching back and forth of the input side of the choke between the two input terminals of the circuit, the adjusting transistor being controlled in dependence on the output voltage, comprising the steps of controlling the adjusting transistor by rectangular control oscillations of constant period duration and amplitude generated in a control circuit, and superimposing a triangular auxiliary voltage of constant period duration on a voltage proportional to the stabilized output voltage to alter the keying ratio of such oscillations in dependence on the input voltage of the stabilization circuit.

THE DISCLOSURE

The invention relates to a method of stabilizing a direct current with an adjusting transistor lying in the series branch of the stabilizing circuit, a choke coil serving as an energy storage and a diode disposed in the transverse branch, periodically switching the input side of the choke coil back and forth between the two input terminals of the circuit, the adjusting transistor being controlled in dependence on the voltage existing at the output terminals of the circuit.

Circuits which operate according to this or a similar method are known under the designation "switching regulators." Likewise, various methods are known for controlling the adjusting transistor of such a switching regulator.

The opening and blocking of the adjusting transistor can take place, for example, at certain voltage values below and above the nominal output voltage. Such a two-point regulator operates with a switching frequency fluctuating within wide limits, which, moreover, cannot be freely selected. The switching frequency is necessarily dependent on the alternating voltage superimposed on the stabilized direct voltage. Since the switching frequency cannot be lowered at will, because of the switching losses in the adjusting transistor, the attainable filtering is for many uses inadequate.

Other known circuits utilize for the control of the adjusting transistor the voltage at the air core choke of the load circuit. Also this feed-back switching regulator operates with a widely variable switching frequency, and between the switching frequency and the superimposed alternating voltage there exists an interdependence which makes the dimensioning difficult. In many cases a subsequent filtering is necessary, which, however, in turn impairs the dynamic behavior of the switching regulator. The control voltage of the adjusting transistor is determined by the voltage at the air core choke, so that a great regulating range, and particularly a short circuit at the output of the switching regulator cannot be controlled without difficulty.

These drawbacks are avoided according to the invention by a method wherein the adjusting transistor is controlled by rectangular control oscillations generated in a control circuit, of constant period duration and amplitude, whose scanning ratio is adjusted by superimposition of a triangular auxiliary voltage of constant period duration and the stabilized output voltage, in dependence on the input voltage or the output current of the stabilization circuit.

Thereby, the switching frequency and the magnitude of the control voltage is determined completely independently of the control circuit, and the stabilization of the output voltage is accomplished merely by the modification of the relation of the conductive time to blocking time of the adjusting transistor. The control of the adjusting transistor by a method different from known processes presents a number of advantages which are determinative for the properties of the whole switching regulation and determine its possibilities of utilization. Thus, with a relatively low expenditure in filtering means, the alternating voltage superimposed on the direct voltage can be kept small. The method, moreover, produces a large regulating range and is also suitable for stabilizing large direct voltages.

According to a further advantageous development of the invention, by supplementing the basic circuit of the switching regulator operating according to the new method by a transistor direct current transformer connected to the outputs of the circuit, direct voltages up to several 1000 v. can be stabilized. This advantage results from the fact that the switching regulator for the adjusting transistor is driven at a constant switching frequency.

In a further development of the invention there is provided in the control circuit for the practice of the method a transistor inverter as a square wave generator, from whose rectangular output voltage, by means of two RC members, the sawtooth auxiliary voltage of constant period duration is derived. There is provided, moreover, a bistable flip-flop circuit which, controlled by the amplified summation voltage formed from the triangular voltage and the output voltage of the stabilizing circuit, alternately switches one of the two equal direct voltages of opposite polarity in a keying ratio dependent on the output voltage, with great flank steepness, onto the control stretch of the transistor.

The invention is explained in detail with the aid of the drawing, in which:

FIG. 1 is a schematic diagram of a circuit embodying the invention;

FIG. 2 illustrates the voltage relationship involved; and

Figure 3:
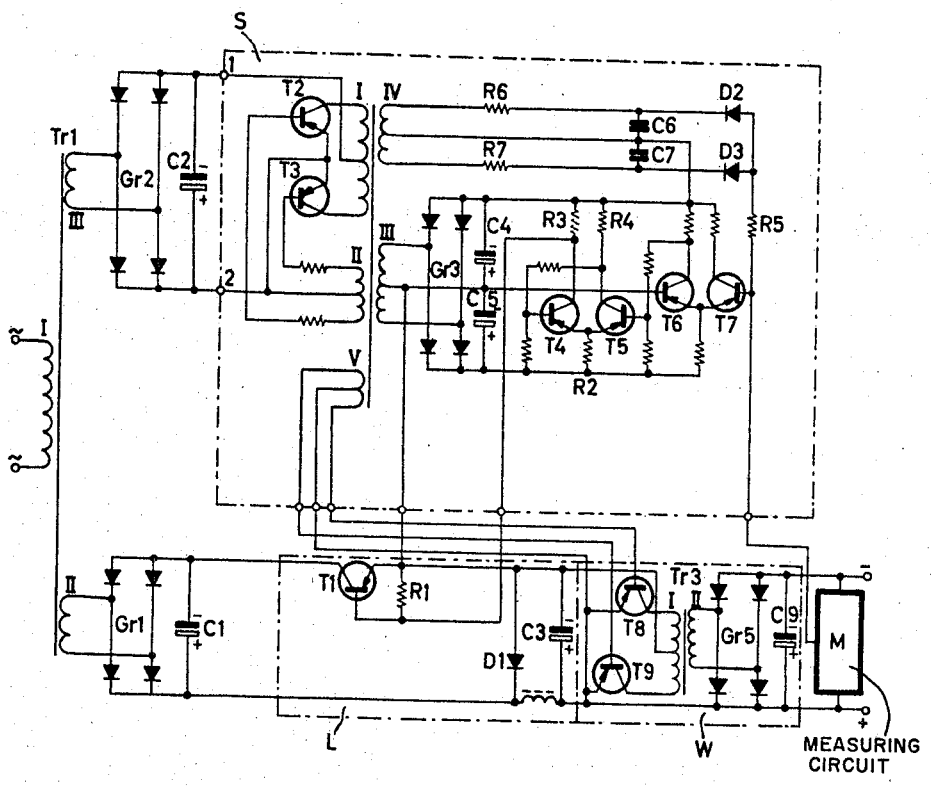
FIG. 3 is a figure, similar to FIG. 1, illustrating a further development of the invention.

As an example of the use of an externally controlled switching regulator, FIG. 1 illustrates a regulated power supply apparatus which contains a switching regulator with an adjusting transistor. The supply voltage is connected to the primary winding I of the power transformer Tr1, whose secondary windings II and III, respectively, supply the feed voltages for the load circuit L and for the control portion S.

The voltage rectified by the rectifiers Gr1 and smoothed by the condenser C1 is fed to the load circuit of the switching regulator, which load circuit is designed according to a known circuit and contains the adjusting transistor T1, the diode D1, the storage choke Dr, and the condenser C3 for the smoothing of the output voltage. If the adjusting transistor T1 is conductive (pass time), a linearly rising current then flows over the transistor T1 and the choke Dr to the output. On blocking of transistor T1 the current flow continues, linearly diminishing in the choke, over the diode D1 (blocking time).

The ratio of pass time to blocking time (keying ratio) determines the magnitude of the output voltage. A deviation of the output voltage from the desired value brings about, over a measuring circuit M and the control part S, a modification of the keying ratio which counteracts the voltage deviation. The measuring circuit M consists of a bridge circuit with a Zener diode as a reference voltage source, and a transistor as an amplifier. The arrangement feeds to the control portion a current which is proportional to the output voltage (voltage regulation) or, after exceeding the nominal value, to the load current (current limitation).

The control portion S is fed from an auxiliary direct voltage so that its dimension becomes entirely independent of the output voltage of the regulator. The input direct voltage for the control portion is rectified and smoothed by the rectifiers $Gr2$ and the condenser C2. The direct voltage feeds an auxiliary inverted in push-pull arrangement, which consists primarily of the transistors T2 and T3 and also the transformer $Tr2$. The reversing of the transistors is effected by saturation of the transformer. The operating frequency, therefore, is freely selectable independently of the power supply frequency. The switching frequency of the transistor regulator is equal to twice the inverter frequency. A value of approximately 500 Hz. for the operating frequency of the inverter has proved advantageous in view of the switching losses of the transistor T1.

The secondary winding III of the inverter transformer $Tr2$ delivers a rectangular voltage which is rectified by the rectifier $Gr3$ and smoothed by the condensers C4, C5. The center tap of the winding is connected with the midpoint of the condensers and with the emitter of the adjusting transistor T1, so that with respect to the reference point (OV) there exists a positive and a negative direct voltage. The summation voltage feeds a bistable flip-flop circuit with the transistors T4, T5. The corresponding resistors R2 to R4 are so dimensioned that when the transistor T4 is conducting, positive potential lies on the base of the adjusting transistor T1 (during the blocking time) and when the transistor T4 is blocked, negative potential is applied over the resistor R3. The flip-flop circuit is controlled by an amplifier stage with the transistors T6, T7. From the continuous control through the amplifier stage, the flip-flop circuit generates a rectangular control voltage with great flank steepness, which assures a rapid switching of the transistor T1.

From the rectangular voltage delivered by the secondary winding IV there is derived over the RC members R6/C6 and R7/C7 an approximately sawtooth voltage at the condensers C6 and C7. Such sawtooth voltage consists of the steeply running partial elements of the exponential charging and discharging curve. The sawtooth voltage is rectified by the diodes D2, D3 and is connected in series with the direct current at the condenser C4.

The manner of operation of the control portion S is explained with the aid of FIG. 2. At the input of the amplifier stage, that is at the base of the transistor T7, there exists the superimposition of two voltages. Proceeding from the reference point OV (emitter of transistor T1), there exists as negative voltage the triangular voltage $U_D$ with superimposed direct voltage $U_M$ (FIG. 2a). Against voltage $U_D$ there acts the direct voltage $U_M$ generated at the resistor R5 by a current from the measuring circuit. The summation voltage corresponds to the emitter base voltage of transistor T7, because its emitter potential deviates from the assumed reference point (OV) only by the negligibly small emitter base voltage of transistor T6. The transistor T7, at a certain voltage $U_M$, is alternately blocked and rendered conductive. Since only the positive base voltage can freely develop itself, there results the base voltage course which appears in FIG. 2a; the curve sections drawn in broken lines being present only to explain the development. As long as the transistor T7 is blocked, T6 remains conductive, T5 blocked and T4, again, conductive. The adjusting transistor T1 received, as indicated in FIG. 2b, positive base voltage and remains blocked until the base voltage at the transistor T7, corresponding to the course of the triangular voltage, becomes negative and, over the flip-flop circuit, initiates the pass time of the adjusting transistor T1. FIGS. 2c and 2d show the course of the emitter-collector voltage at the transistor T1 and the course of the current in the storage choke Dr. The resistor R1 forms a low ohmic closure of the emitter base path and assures the blockability of the transistor T1 even when no control exists through the control portion. This is the case, for example, if the auxiliary voltage is not present at terminals 1, 2 of the control portion.

The regulating effect of the circuit is as follows: An assumed increase of the output voltage increases the direct current which the measuring circuit delivers to the control portion. The voltage $U_M$ becomes greater and shifts the summation curve in FIG. 2a upward into the positive. The pass time of the transistor T7 and thereby likewise of adjusting transistor T1 becomes shorter, and the blocking time longer, while the period duration remains unchanged. The assumed voltage increase is balanced, without change in the switching frequency, merely by the alteration of the keying ratio. The particular keying ratio is thus determined only by the ratio of the input to the output voltage, a dependence of the keying ratio on the load results merely from the internal resistance of the power supply apparatus inserted in the circuit and from the ohmic voltage drop of the regulator.

The working range extends from one limit position to the other: The transistor T1 can be continuously conductive or continuously blocked. In these limit positions and in all intermediately situated working points the adjusting transistor T1 is constantly operated with the same base voltage and the same base current.

The adjusting transistor T1, during the blocking time, is connected with the sum of the input voltage at condenser C1 and the pass voltage at diode D1. The pass voltage of diode D1 is very small, so that the admissable blocking voltage at the transistor determines the highest input voltage of the regulator. Power supply voltage changes and the load dependence, also has a determining effect on the possible output voltage. The stabilization of greater direct voltages is, however, easily possible in a simple manner by means of several additions, which do not, however, alter the described principle of the control through the control portion.

FIG. 3 illustrates the circuit of a switching regulator with transistor-inverter connected in series, through which the stabilization of relatively large direct currents is possible up to several thousand volts. The voltage delivered by the switching regulator at the condenser C3 serves as input voltage for a transistor-inverter according to a known push-pull circuit arrangement. The inverter consists of the two transistors T8 and T9, the transformer $Tr3$, and the rectifier $Gr5$ with the condenser C9. For the control of the transistors T8, T9, the winding V of the inverter-transformer $Tr2$ of the control portion is utilized. The inverter accordingly operates with the same frequency of 500 Hz. as the auxiliary inverter of the control portion. The frequency raised 50 Hz. with respect to the power supply frequency is advantageous because it permits small transformer design and low filtering expenditure at the output of the inverter. The favorable operational frequency of the inverter is achieved at the externally controlled switching regulator without additional expenditure in switching means.

The positive pole of the output voltages of the switching regulators and of the inverter (condensers C3 and C9) are so connected that the measuring circuit connected to the output voltage to be regulated can act on the control portion in a manner as previously described. In dependence on the output voltage, that is, the voltage delivered from the inverter, the keying ratio of the switching regulator is so established that the inverter always receives the necessary input voltage and there results a stabilization of the voltage delivered by the entire apparatus.

Changes may be made within the scope and spirit of the appended claims which define what is believed to be new and desired to have protected by Letters Patent.

I claim:

1. An arrangement for stabilizing a direct voltage with an adjusting transistor lying in the series branch of the stabilization circuit, a choke serving as energy storage, and a diode arranged in a transverse branch, the adjusting transistor being controlled in dependence on the output voltage, comprising a generator having a rectangular output voltage, two RC members operatively connected to said generator output to form from said rectangular output voltage a triangular auxiliary voltage of constant period duration, means for delivering a voltage proportional to the stabilized output voltage, a bistable flip-flop circuit the output of which is connected to the input terminals and producing a square wave output, and to said adjusting transistor, means for operatively applying a summation voltage formed by said triangular voltage and said proportional voltage to the input of said bistable flip-flop circuit whereby the latter is operative to alternately switch said adjusting transistor in a keying ratio, dependent on the stabilized output voltage, with great flank steepness.

2. In apparatus according to claim 1, a sawtooth generator coupled to the input terminal and receiving the output of the measuring circuit, and the combined outputs of the sawtooth generator and the measuring circuit connected to the flip-flop circuit to vary the relative lengths of its positive and negative outputs.

References Cited

UNITED STATES PATENTS

| | | | |
|---|---|---|---|
| 3,004,206 | 10/1961 | Sheffet | 321—18 |
| 3,226,630 | 12/1965 | Lampke | 323—22 |
| 3,235,787 | 2/1966 | Gordon et al. | 307—88.5 |
| 3,270,269 | 8/1966 | Low | 321—18 |
| 3,284,692 | 11/1966 | Gautherin | 321—16 |
| 3,286,157 | 11/1966 | Leestic | 323—22 |
| 3,290,583 | 12/1966 | Sinclair | 323—22 |

JOHN F. COUCH, *Primary Examiner.*

A. D. PELLINEN, *Assistant Examiner.*